US00RE46318E

(19) United States
(12) Reissued Patent
Heikenfeld et al.

(10) Patent Number: US RE46,318 E
(45) Date of Reissued Patent: Feb. 21, 2017

(54) COLORED FLUIDS FOR ELECTROWETTING, ELECTROFLUIDIC, AND ELECTROPHORETIC TECHNOLOGIES

(71) Applicants: Jason C. Heikenfeld, Cincinnati, OH (US); Russell Schwartz, Cincinnati, OH (US); Lisa Clapp, Cincinnati, OH (US); April Milarcik, Cincinnati, OH (US); Stanislav G. Vilner, South Lebanon, OH (US)

(72) Inventors: Jason C. Heikenfeld, Cincinnati, OH (US); Russell Schwartz, Cincinnati, OH (US); Lisa Clapp, Cincinnati, OH (US); April Milarcik, Cincinnati, OH (US); Stanislav G. Vilner, South Lebanon, OH (US)

(73) Assignee: Sun Chemical Corporation, Parsippany, NJ (US)

(21) Appl. No.: 14/279,466

(22) Filed: May 16, 2014

Related U.S. Patent Documents

Reissue of:
(64) Patent No.: 8,717,663
Issued: May 6, 2014
Appl. No.: 13/202,457
PCT Filed: Mar. 15, 2010
PCT No.: PCT/US2010/000767
§ 371 (c)(1),
(2) Date: Dec. 19, 2011
PCT Pub. No.: WO2010/104606
PCT Pub. Date: Sep. 16, 2010

U.S. Applications:
(60) Provisional application No. 61/231,156, filed on Aug. 4, 2009, provisional application No. 61/160,113, filed on Mar. 13, 2009.

(51) Int. Cl.

| | |
|---|---|
| ***G02B 26/00*** | (2006.01) |
| ***G02F 1/03*** | (2006.01) |
| ***G02B 1/06*** | (2006.01) |
| ***G02B 5/23*** | (2006.01) |
| ***C09B 67/46*** | (2006.01) |

(52) U.S. Cl.
CPC ..... *G02B 26/005* (2013.01); *C09B 67/009* (2013.01); *C09B 67/0084* (2013.01)

(58) Field of Classification Search
None
See application file for complete search history.

(56) References Cited

U.S. PATENT DOCUMENTS

| | | | |
|---|---|---|---|
| 6,726,762 | B2 | 4/2004 | Okamoto et al. |
| 7,359,108 | B2 | 4/2008 | Hayes et al. |
| 7,403,325 | B2 | 7/2008 | Chopra et al. |
| 7,548,363 | B2 | 6/2009 | Hayes et al. |
| 7,639,355 | B2 | 12/2009 | Fattal et al. |
| 7,729,034 | B2 | 6/2010 | Nakano et al. |
| 7,763,314 | B2 | 7/2010 | Dai et al. |
| 7,791,814 | B2 | 9/2010 | Liogier D'ardhuy et al. |
| 7,839,555 | B2 | 11/2010 | Nakano et al. |
| 7,839,558 | B2 | 11/2010 | Cheng et al. |
| 7,903,061 | B2 | 3/2011 | Zhang et al. |
| 8,194,304 | B2 | 6/2012 | Niwano et al. |
| 8,264,777 | B2 | 9/2012 | Skipor et al. |
| 8,323,392 | B2 | 12/2012 | Jones et al. |
| 8,329,067 | B2 | 12/2012 | Nishida et al. |
| 8,329,761 | B2 | 12/2012 | Nair et al. |
| 8,358,275 | B2 | 1/2013 | Huitema |
| 8,390,545 | B2 | 3/2013 | Van Den Biggelaar et al. |
| 8,427,753 | B2 | 4/2013 | Bartels et al. |
| 8,717,663 | B2 | 5/2014 | Heikenfeld et al. |
| 8,854,714 | B2 | 10/2014 | Clapp et al. |
| 2002/0185378 | A1* | 12/2002 | Honeyman ..... B82Y 30/00 204/601 |
| 2007/0040982 | A1 | 2/2007 | Nakano et al. |
| 2007/0047095 | A1 | 3/2007 | Jung et al. |
| 2007/0112189 | A1 | 5/2007 | Ikeda et al. |
| 2007/0177276 | A1 | 8/2007 | D'ardhuy et al. |
| 2007/0189998 | A1 | 8/2007 | Nair et al. |
| 2007/0189999 | A1* | 8/2007 | Jones et al. ..... 424/63 |
| 2007/0263306 | A1 | 11/2007 | Hayes et al. |
| 2008/0265211 | A1 | 10/2008 | Rehman et al. |
| 2009/0046082 | A1* | 2/2009 | Jacobson ..... G02B 26/005 345/204 |
| 2009/0059348 | A1* | 3/2009 | Niwano et al. ..... 359/296 |
| 2009/0191334 | A1 | 7/2009 | Dai et al. |

FOREIGN PATENT DOCUMENTS

| | | | |
|---|---|---|---|
| CN | 102369474 | A | 3/2012 |
| CN | 102549474 | A | 7/2012 |
| EP | 1887406 | | 2/2008 |
| EP | 1975214 | | 10/2008 |
| EP | 1975214 | A1 | 10/2008 |

(Continued)

OTHER PUBLICATIONS

Heinrich Zollinger, "Color Chemistry—Systheses, Properties and Applications of Organic Dyes and Pigments", pp. 241-243, 1987.*

(Continued)

*Primary Examiner* — Ling Xu
(74) *Attorney, Agent, or Firm* — Frost Brown Todd LLC

(57) ABSTRACT

Colored fluids for electrowetting, electro fluidic, or electrophoretic devices, and the devices themselves, are disclosed. The colored fluid can include a non¬ aqueous polar solvent having (a) a dynamic viscosity of 0.1 cP to 50 cP at 250 C, (b) a surface tension of 25 dynes/cm to 55 dynes/cm at 250 C, and (c) an electrowetting relative response of 40% to 80%. Such colored fluids further include a colorant selected from a pigment and/or a dye. In another embodiment, the colored fluid can include a non-polar solvent and an organic colorant selected from a pigment and/or a dye. Such colored fluids can be black in color and have a conductivity from 0 pS/cm to 5 pS/cm and a dielectric constant less than 3. The use of the colored fluids offers improvements in reliability, higher levels of chroma in the dispersed state, and the ability to achieve higher contrast ratios in display technologies.

13 Claims, 3 Drawing Sheets

(56) References Cited

FOREIGN PATENT DOCUMENTS

| | | | |
|---|---|---|---|
| GB | 2429530 | | 2/2007 |
| JP | 2005-193325 | | 7/2005 |
| JP | 2006-195190 | | 7/2006 |
| JP | 2007-58218 | | 3/2007 |
| JP | 2007-310402 | | 11/2007 |
| JP | 2008-203282 | | 9/2008 |
| JP | 2008-247939 | | 10/2008 |
| JP | 2009-525502 | | 7/2009 |
| JP | 2009-526634 | | 7/2009 |
| JP | 2009-199013 | | 9/2009 |
| JP | 2010-173555 | | 8/2010 |
| JP | 4666531 | | 4/2011 |
| JP | 2013-506881 | | 2/2013 |
| JP | 5635018 | B2 | 12/2014 |
| JP | 5671026 | B2 | 2/2015 |
| KR | 10-1504406 | B1 | 3/2015 |
| WO | WO 93/07464 | | 4/1993 |
| WO | WO 2004/068208 | A1 | 8/2004 |
| WO | WO 2006/129846 | | 12/2006 |
| WO | WO 2007/049196 | A2 | 5/2007 |
| WO | WO 2007/064141 | A1 | 6/2007 |
| WO | WO 2007/071904 | | 6/2007 |
| WO | WO 2007/088453 | | 8/2007 |
| WO | WO 2007/094960 | | 8/2007 |
| WO | WO 2008/0128691 | | 10/2008 |
| WO | WO 2008/128697 | | 10/2008 |
| WO | WO 2008/0128697 | | 10/2008 |
| WO | WO 2008/150668 | A1 | 12/2008 |
| WO | WO 2009/002701 | A2 | 12/2008 |
| WO | WO 2009/036272 | | 3/2009 |
| WO | WO 2010/104606 | | 9/2010 |
| ZA | 2012/00798 | B | 10/2012 |
| ZA | 2011/06482 | B | 3/2013 |

OTHER PUBLICATIONS

English Translation of Fourth Office Action for Chinese Application No. CN 2010800116671.

Notice of Allowance dated Sep. 8, 2014 for U.S. Appl. No. 13/388,581.

Balaji, R., et al., "Ion and Liquid Dependent Dielectric Failure in Electrowetting Systems", Langmuir, 3b2, version 9, Aug. 13, 2009.

Herberth, "Fluid manipulation by Means of Electrowetting-On-Dielectrics" Dissertation on Doctorate from the Faculty of Applied Sciences at the Albert-Ludwigs University of Freiburg in Breisgau, May 2006, pp. 1-184. Retrieved from the Internet http://www.freidok.uni-freiburg.de/volltexte/2782/pdf/fluid_manipulation_by_means_of_ewod.pdf.

Manku, G.S., *Theoretical Principles of Inorganic Chemistry*, Tata McGraw-Hill, New Delhi, India, pp. 96-105, 1980.

Mita, I., et al., "Basic Classification and Definitions of Polymerization Reactions", Pure & Appl. Chem., vol. 56, No. 12, pp. 2483-2486, 1994.

International Search Report and Written Opinion dated Oct. 1, 2010 for Application No. PCT/US2010/044441.

International Preliminary Report on Patentability dated Feb. 7, 2012 for Application No. PCT/US2010/044441.

International Search Report and Written Opinion dated May 14, 2010 for Application No. PCT/US2010/000767.

English Translation of First Office Action for Chinese Application No. CN 2010800116671.

English Translation of Second Office Action for Chinese Application No. CN 2010800116671.

English Translation of Third Office Action for Chinese Application No. CN 2010800116671.

Chinese Search Report, First Search, for Application No. 201080043651.9.

Japanese Office Action dated Mar. 17, 2014 for Application No. JP 2012-523734.

Japanese Office Action dated May 30, 2014 for Application No. JP 2011-554053.

Restriction Requirement dated Nov. 25, 2013 for U.S. Appl. No. 13/388,581.

Non-Final Office Action dated Apr. 10, 2014 for U.S. Appl. No. 13/388,581.

Notice of Allowance dated Jul. 18, 2014 for U.S. Appl. No. 13/388,581.

Supplemental European Search Report dated Mar. 15, 2013 for Application No. EP 10751143.

Supplemental European Search Report dated Mar. 19, 2013 for Application No. EP 10807111.

English Translation of the Text of the First Office Action for Chinese Publication CN 2010800116671.

English Translation of the Text of the Second Office Action for Chinese Publication CN 2010800116671.

International Searching Authority, International Search Report and Written Opinion issued in related International application No. PCT/US10/000767 dated May 14, 2010.

English Translation of Chinese Office Action dated Feb. 10, 2014 for Application No. JP 2011-554053.

Abstract and English Machine Translation of Japanese Patent No. JP 2005-193325.

Abstract and English Machine Translation of Japanese Patent No. JP 2008-203282.

Abstract and English Machine Translation of Japanese Patent No. JP 2010-173555.

* cited by examiner

COLORED FLUIDS FOR ELECTROWETTING, ELECTROFLUIDIC, AND ELECTROPHORETIC TECHNOLOGIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Provisional Application No. 61/231,156, filed Aug. 4, 2009, and claims the benefit of U.S. Provisional Application No. 61/160,113, filed Mar. 13, 2009, the disclosures of which are hereby incorporated by reference herein in their entireties.

TECHNICAL FIELD

The present invention relates generally to the field of electrowetting, and more specifically to colored fluids for electrowetting, electrofluidic, or electrophoretic devices, and to electrowetting, electrofluidic, and electrophoretic devices.

BACKGROUND

Electrowetting has become an attractive modulation scheme for a variety of optical applications due in part to a desirable combination of high brightness and contrast ratio, a large viewing angle, and a fast switching speed. In addition, the power consumption of electrowetting displays is relatively low because they do not require front or backlighting. For example, electrowetting has been used to provide optical switches for fiber optics, optical shutters or filters for cameras and guidance systems, optical pickup devices, optical waveguide materials, and video display pixels. The term "electrowetting" describes the effects of an electric field on the contact angle of a liquid with a hydrophobic surface. With an electric field, the liquid distributes over, or wets, a surface that initially repels the liquid resulting in a change in the spectral properties of a device. When the electric field is removed, the contact angle increases and the liquid contracts into an area whereby the spectral properties are returned to the initial state.

Colored immiscible fluids are an indispensible part of electrofluidic and electrowetting devices, where reproduction of visual information and effects are required for the application. Conventional electrowetting devices typically have a colored oil that forms a film over an insulating fluoropolymer. This colored oil film imparts a visible color to the device. When a voltage is applied between a water layer situated above the oil film and an electrode beneath the insulating fluoropolymer, the oil film is disrupted as water electrowets the surface. The disrupted oil film no longer provides color to the device. Once the voltage is removed, the oil preferentially wets the insulating fluoropolymer, the oil film is reformed, and the color is again evident.

In general, the colorant can be a dye or a pigment. Historically, dyes have been the colorant of choice for various digital applications such as inkjet inks, color filters, and electrowetting devices. Dyes however have certain disadvantages including poor light and weather fastness.

Other disadvantages include high cost, especially for purified forms, inadequate solubility in non-polar solvents, low resistance to bleed, and/or a lack of opacity. In applications where dyes have been employed as coloring agents, organic pigments have been finding increased utility in recent years for due to desirable light fastness and resistance to solvents and bleed. Such applications include, for example, inks for writing instruments, in which water or oil-soluble dyes have been used as coloring agents; and colorants for plastics, in which oil-soluble dyes have been used as highly transparent colorants. There is also increasing demand for pigments as coloring agents for LCD color filters, toners, and ink jet inks.

Many devices that work with electrowetting use a combination of water and oil. However, the physical properties of water, such as expansion at higher temperature and freezing point, limit the applications for such devices. While the problems associated with the use of water and conventional dyes are being addressed, there still remains a clear need for improved colored fluids for a variety of electrowetting and electrofluidic devices.

It would thus be beneficial to provide an improved colored fluid for electrowetting, electrofluidic, or electrophoretic devices that, for example, can enhance device performance and maintain a desired function over a preferred period of time.

SUMMARY

The embodiments of the invention provide colored fluids for an electrowetting, electrofluidic, or an electrophoretic device.

In one embodiment, the colored fluid includes at least one non-aqueous polar solvent having (a) a dynamic viscosity of 0.1 cP to 50 cP at 25° C., (b) a surface tension of 25 dynes/cm to 55 dynes/cm at 25° C., and (c) an electrowetting relative response of 40% to 80%. The colored fluid further includes at least one colorant selected from a pigment and/or a dye. The colored fluid defines a colored polar fluid.

In another embodiment, the colored fluid includes at least one non-polar solvent and at least one organic colorant selected from a pigment and/or a dye. The colored fluid is black in color, has a conductivity from 0 pS/cm to 5 pS/cm, and a dielectric constant less than 3. The colored fluid defines a colored non-polar fluid.

In another embodiment, a pixel for a display is disclosed, which includes a reservoir and a colored fluid in the reservoir. The colored fluid includes at least one non-polar solvent and at least one organic colorant selected from a pigment and/or a dye. The colored fluid is black in color, has a conductivity from 0 pS/cm to 5 pS/cm, and has a dielectric constant less than 3. A plurality of charged particles is suspended within the colored fluid. A plurality of electrodes is configured to apply a potential difference effective to cause the charged particles to move within the color fluid relative to at least one of the electrodes.

In yet another embodiment, a pixel for a display includes a reservoir and a colored fluid in the reservoir, which includes at least one non-aqueous polar solvent having (a) a dynamic viscosity of 0.1 cP to 50 cP at 25° C., (b) a surface tension of 25 dynes/cm to 55 dynes/cm at 25° C., and (c) an electrowetting relative response of 40% to 80%, and at least one colorant selected from a pigment and/or a dye. A plurality of electrodes is configured to apply a potential difference effective to move the colored fluid relative to at least one of the electrodes.

In still another embodiment, a pixel for a display includes a reservoir and a colored fluid in the reservoir, which includes at least one non-polar solvent and at least one organic colorant selected from a pigment and/or a dye. The colored fluid is black in color, has a conductivity from 0 pS/cm to 5 pS/cm, and has a dielectric constant less than 3. A polar fluid is also in the reservoir and occupies a volume within the reservoir not occupied by the colored fluid. A plurality of electrodes is configured to apply a potential difference effective to move the polar fluid relative to at least one of the electrodes such that the movement of the polar fluid changes a shape of the colored fluid.

The use of such colored fluids in display technologies offers improvements in durability, and provides higher levels of chroma in the dispersed state and an ability to achieve higher contrast ratios through pigment selection. The colored fluids can also provide fast switching speeds, low power consumption, and greater device durability.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
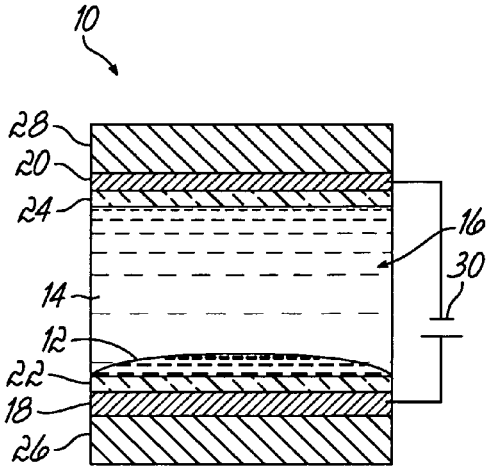
FIG. 1A is a diagrammatic cross-sectional view of an electrowetting device operating as a display pixel in accordance with an embodiment of the invention.

The present invention is directed to colored fluids for electrowetting or electrofluidic devices. Electrowetting devices are typically composed of hydrophobic dielectrics and electrodes, and may include other hydrophilic surfaces. In general, the substrates and connected features are exposed to a polar and/or a non-polar fluid, preferably in a liquid form.

In accordance with embodiments of the present invention, the colored fluid can generally include at least one non-aqueous polar solvent, at least one colorant, which may be a pigment and/or a dye, and optionally a dispersant, a synergist, a surfactant, a resin, a polymer, a biocide, other additives known in the art, or any combination thereof The colored fluid defines a colored polar fluid. The modifier "non-aqueous" in non-aqueous polar solvent is intended to exclude water from the potential list of polar solvents. In one example, the colored fluid is devoid of a non-polar solvent.

In another embodiment, the colored fluid can generally include at least one non-polar solvent, at least one colorant, which may be a pigment and/or a dye, and optionally a dispersant, a synergist, a surfactant, other additives known in the art, or any combination thereof. The colored fluid defines a colored non-polar fluid. In one example, the colored fluid is black in color. In another example, the colored fluid, which includes the non-polar solvent, is devoid of a resin and/or a polar solvent.

The non-aqueous polar solvent of the invention may be an individual solvent or any combination of two or more solvents. Non-limiting examples of the non-aqueous polar solvent include glycols, alcohols, polyols, ethers, esters, ketones, acetals, ketals, lactones, carbonates, lactams, urethanes (carbamates), ureas, pyrrolidines, pyrrolidones, sulfones, sulfoxides, amides, primary, secondary, tertiary, or quaternary amines, imines, nitriles, carboxylic acids, aldehydes, halogenated, thio, or nitro compounds, and any mixtures thereof. In one example, the non-aqueous polar solvent is a lactone, a carbonate, or a glycol selected from 1,2-propylene glycol, 1,3-propylene glycol, 1,4-butylene glycol, diethylene glycol, or dipropylene glycol. The non-aqueous polar solvent also can contain one, two or multiple identical or various described functional groups in their molecule that can be of an aliphatic, aromatic, alicyclic, and/or heterocyclic nature.

In one example, the non-aqueous polar solvent can be described by one or more of the following formulas:

(1)

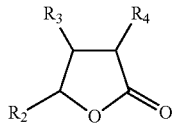

(2)

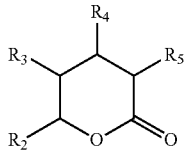

(3)

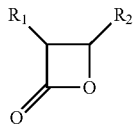

(4)

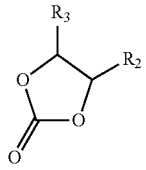

(5)

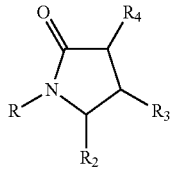

-continued (6)

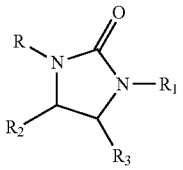

(7)

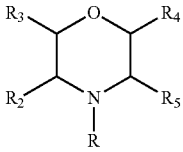

(8)

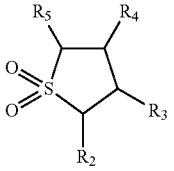

(9)

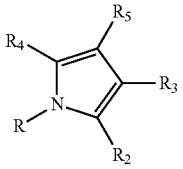

wherein R and $R_1$ independently are H, a $C_1$-$C_{12}$ alkane (Alk), an aryl (Ar), an alkane aryl, or $O(RR_1O)_nH$; $R_2$, $R_3$, $R_4$, and $R_5$ independently are H, $C_1$-$C_{12}$ Alk, Ar,AlkAr, halogen, OH, OAlk, OAr, SAlk, SAr, COOH, COOR, COOAr, CONAlk, CONAr, =O, $CH_3C$=O, CN, $N(R)_4$, $CONR(ROH)_m$, COO $(RR_1O)_nR$, $CONR(RR_1O)_nR$, or $NRR_1(RR_1O)_nH$; n=1-50; and m=1-2.

Non-limiting specific examples of non-aqueous polar solvents are 1,2-propylene glycol, 1,3-propylene glycol, 1,4-butylene glycol, diethylene glycol, dipropylene glycole, ethylene carbonate, propylene carbonate, 1,2-butylene carbonate, 1,2-cyclohexane carbonate, glycerine carbonate, dimethyl carbonate, diethyl carbonate, acetophenone, pyridine, dimethyl malonate, diacetone alcohol, hydroxypropyl carbamate, beta-hydroxyethyl carbamate, N-methyl formamide, N-methyl acetamide, dimethylsulfoxide, sulfolane, 2-pyrrolidone, N-methyl-2-pyrrolidone, N-cyclohexyl-2-pyrrolidone, acetonyl acetone, cyclohexanone, ethyl acetoacetate, ethyl-L-lactate, pyrrole, N-methyl pyrrole, N-ethyl pyrrole, 4H-pyran-4-one, 1,3-dimethyl-2-imidazolidinone, morpholine, N-methylmorpholine, N-ethylmorpholine, N-formylmorpholine, beta-propiolactone, beta-valerolactone, beta-hexalactone, gamma-butyrolactone, gamma-valerorolactone, gamma-hexalactone, gamma-heptalactone, gamma-octalactone, gamma-nonalactone, gamma-decalactone, delta-valerolactone, delta-hexalactone, delta-heptalactone, delta-octalactone, delta-nonalactone, delta-decalactone, delta-tetradecalactone, delta-octadecolactone, and any combination thereof.

The selected non-aqueous polar solvents may also exhibit a dielectric constant equal to or greater than 10 at 25° C. In another example, the dielectric constant is equal to or greater than 25 at 25° C. The non-aqueous polar solvents should also have a surface tension of 25 dynes/cm to 55 dynes/cm at 25° C.

The dynamic viscosity of the non-aqueous polar solvent should be less than 100 cP at 25° C. In another example, the dynamic viscosity is from 0.1 cP to 50 cP at 25° C. In yet another example, the dynamic viscosity is from 0.5 cP to 50 cP at 25° C.

The non-aqueous polar solvent also should demonstrate an electrowetting relative response (EWRR) to direct or alternating current of 30V in the range of 40-80%. EWRR is defined here according to the following formula:

$$EWRR=(\theta_0-\Theta_V)\times 100/\Theta_0,\%$$

wherein $\Theta_O$ is the initial contact angle at a voltage of 0V; $\Theta_V$ is the final contact angle at a voltage of 30V. A suitable procedure for measurement of contact angles is described in Balaji Raj et al., "Ion and Liquid Dependent Dielectric Failure in Electrowetting Systems", Langmuir|3b2|ver.9|18/7/09, the contents of which is incorporated by reference herein in its entirety, and is further discussed in detail below under test procedures.

In one example, the colored fluid includes at least one non-aqueous polar solvent having (a) a dynamic viscosity of 0.1 cP to 50 cP at 25° C., (b) a surface tension of 25 dynes/cm to 55 dynes/cm at 25° C., and (c) an electrowetting relative response of 40% to 80%; and at least one colorant selected from a pigment and/or a dye.

The pigment that is included in the colored fluid having the non-aqueous polar solvent can be any organic pigment including, but not limited to, an azo, a metal complex, benzimidazolone, azomethine, methine, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, or pyranthrone pigments. Non-limiting specific examples of the organic pigments are C.I. Pigment Black 1,2, 3, 31, and 32; C.I. Pigment Green 7, 36, 37, 47, 54, and 58; C.I. Pigment Blue 15:1, 15:2, 15:3, 15:4, 15:6, 16, 21, 22, 60, 64, 65, 75, and 76; C.I. Pigment Violet 19, 23, 29, 31, 33, and 37; C.I. Pigment Red 122, 123, 144, 149, 166, 168, 170, 171, 175, 176, 178, 179, 180,183, 189, 190, 192, 196, 202, 208, 209, 214, 216, 220, 221, 224, 226, 242, 248, 254, 255, 260, 264, and 271; C.I. Pigment Orange 36, 40, 43, 51, 60, 61, 62, 64, 66, 69, 71, 72, 73, and 77; C.I. Pigment Yellow 24, 74, 83, 93, 94, 95, 108, 109, 110, 120, 123, 138, 139, 150, 151, 154, 155, 167, 170, 171, 173, 174, 175, 180, 181, 185, 192, 193, 194, 199, 213, and 218. In one example, the organic pigment is selected from C.I. Pigment Black 1, 31, and 32; C.I. Pigment Green 7, 36, 37; C.I. Pigment Blue 15:1, 15:2, 15:3, 15:4, 15:6, 16, 60, and 64; C.I. Pigment Violet 19, 23, and 29; C.I. Pigment Red 122, 144, 175, 176, 178, 183, 202, 208, 209, 254, 255, 264, and 271; C.I. Pigment Orange 36, 64, 71, 72, and 73; or C.I. Pigment Yellow 74, 83, 110, 120, 138, 139, 150, 151, 154, 155, 175, 180, 181, 185, and 213.

The pigment that is included in the colored fluid having the non-aqueous polar solvent also may be any inorganic pigment, such as carbon black, metal oxide, mixed metal oxide, sulfide, or sulfate. Non-limiting specific examples include titanium dioxide, zinc oxide, iron oxide, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, bismuth vanadate, and derivatives and any combinations thereof. Non-limiting specific examples of inorganic pigments are C.I. Pigment Black 6, 7, 9, 11, 12, 14, 15, 22, 26, 27, 28, 29, 30, 33, 34 and 35; C.I. Pigment Green 18, 20, 21, and 22;

C.I. Pigment Blue 27, 30, and 73; C.I. Pigment Red 265 and 275; C.I. Pigment Yellow 38, 40, 53, 119, 157,158, 160, 161, 162, and 184; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36. In one example, the inorganic pigment is selected from C.I. Pigment Black 6, 7, 9, 11, 12, 14, 15, 22, 26, 27, 28, 29, 30, 33, 34, and 35 or C.I. Pigment White 4, 5, 6, 6:1, 7, 18, 18:1, 26, 28 and 32.

The pigment that is included in the colored fluid having the non-aqueous polar solvent can also be any known extender, for example oxide, carbonate, sulfate, sulfide, or phosphate, and can be synthetic or mineral. Non-limited examples of usable extenders include calcium carbonate, blanc fixe, mica, kaolin, clay, silica, and the like.

The pigment can also be any mixture, complex, or solid solution of two or more organic, inorganic pigments, and extenders.

The pigment that is included in the colored fluid having the non-aqueous polar solvent may also be a dispersed particulate material that is non-soluble in the application media. The dispersed particulate material may be a low molecular weight compound, oligomer, polymer, co-polymer, grafted co-polymer, cross-linked polymer, cured polymer, polymer containing polar anionic or cationic groups in the form of insoluble salts with organic and/or inorganic cations and/or anions, or with other polymers or oligomers with opposite charged groups. The pigment can also be any mixture, solid solution, or product of additional intermolecular reaction or coordination of said low molecular weight compounds, oligomers, and polymers. Non-limiting examples of the aforementioned pigments include melamine or alkylene bis-melamine, vinyl polymer and co-polymers, for example, polyalkylene (polyethylene, polypropylene, polybutylene, polyisobutylene, polyisoprene), polystyrene, polyacrylate (polymethacrylates, polyalkyl/aryl acrylate and methacrylate), polyacrylonitrile, polyvinyl halogenide (polyvinyl chloride, polyvinyl fluoride, polyvinyl bromine), polyvinylidene halogenides, polyvinyl alcohols, polyvinyl acetate, polyvinylpirrolidone, polyvinyl butyral, polyvinyl naphthalene, polyvinyl carbazole, polyamide, polyimide, polyester, polyether, polycarbonate, polyester carbonate, polyacetal, polyurethane, polyurea, polysulfone, poly(ether sulfone), poly(arylene/alkylene) sulfide, polyepoxide, polyaldehyde, polyketone, polyether ether ketone, phenol-formaldehyde, melamine-formaldehyde, urea-formaldehyde, polyethylene terephthalate, polytrimethylene terephthalate, polybutylene terephthalate, hydrocarbon resins, inorganic polymer such as polysiloxanes.

The pigment that is included in the colored fluid having the non-aqueous polar solvent can also include an encapsulated organic pigment, inorganic pigment, extender, or dye. Encapsulation may be done by any method known in the art, including, for example, physical adsorption and/or precipitation of resin, oligomer, or polymer on pigment surface, coacervation, or polymerization of monomers or oligomers in the presence of pigment particles with or without cross-linking or curing. Polymerization can be realized through any known mechanism of polymerization, such as chain polymerization, condensative chain polymerization, polycondensation, and poly-addition (Pure &App/. Chem., Vol. 66, No. 12, pp. 2483-2486, 1994). Non-limiting examples of pre-made polymers or polymers synthesized from monomers in the presence of pigment particles that can be used for encapsulation are vinyl polymers and co-polymers, such as polyalkylene (polyethylene, polypropylene, polybutylene, polyisobutylene, polyisoprene), polystyrene, polyacrylate (polymethacrylates, polyalkyl/aryl acrylate and methacrylate), polyacrylonitrile, polyvinyl halogenide (polyvinyl chloride, polyvinyl fluoride, polyvinyl bromine), polyvinylidene halogenides, polyvinyl alcohols, polyvinyl acetate, polyvinylpirrolidone, polyvinyl butyral, polyvinyl naphthalene, polyvinyl carbazole, polyamide, polyimide, polyester, polyether, polycarbonate, polyester carbonate, polyacetal, polyurethane, polyurea, polysulfone, poly(ether sulfone), poly(arylene/alkylene) sulfide, polyepoxide, polyaldehyde, polyketone, polyether ether ketone, phenol-formaldehyde, melamine-formaldehyde, urea-formaldehyde, polyethylene terephthalate, polytrimethylene terephthalate, polybutylene terephthalate, hydrocarbon resins, or inorganic polymers such as polysiloxanes. The polymer for encapsulation can be any natural or synthetic linear, branched, block, random, comb, grafted, dendritic polymer or co-polymer. In addition, one or more natural or synthetic resins can be used for encapsulation, including, but not limited to, rosin, modified rosin, rosin condensates with maleic anhydride and other unsaturated compounds, gums, alkyds, acrylates and its condensates with maleic anhydride, melamine aldehyde, phenol aldehyde, urea aldehyde, epoxy, polyurethane, acetal, phenolics. Encapsulation can include any combination of polymer, oligomer, and resin.

The pigment that is included in the colored fluid having the non-aqueous polar solvent also can include a surface modified pigment, such as made by method of chemical modification by covalently attaching (grafting) ionic, non-ionic, oligomeric, or polymeric groups to the pigment surface. Non-limiting examples of modifying groups are carboxy, sulfo, arylcarboxy, arylsulfo, phosphate, hydroxy, primary, secondary, tertiary, and quaternary amines, heterocyclic amines, diamines, triamines, polyamines, nitrile, polyalkylene, polyalkyleneoxides, polyester-groups, and any combinations thereof. This group includes self-dispersed pigments. With self-dispersed pigments, the colored fluid can be devoid of a dispersant, for example. In one example, the colored fluid consists of a non-aqueous polar solvent and a self-dispersed pigment.

The pigment may also be a shell type product with inorganic nuclei and organic shell and vice versa.

The dye that is included in the colored fluid having the non-aqueous polar solvent can be any conventional dye including, for example, direct, acid, basic (cationic), reactive, vat, sulfur, solvent, food, mordant, fluorescent, natural, and disperse dye, or any combination thereof. It can be also a complex of any anionic dye with any cationic dye.

The dye that is included in the colored fluid having the non-aqueous polar solvent can also be a modified, oligomeric, or polymeric dye. A modified dye can include a conventional or specially synthesized dye having one or multiple additional functional groups connected directly or through linking groups to one chromophore by means of covalent or ionic bonds with total molecular weight lower than 1,500. Modified dye can also be a complex of two or more dyes connected to each other through covalent, ionic, or hydrogen bonds. These dyes can or cannot have additional substituting groups, and can carry opposite charges and connect to each other directly or have the same charge and be connected through a third non-colored component having an opposite charge. An oligomeric dye can include a compound having at least one chromophore attached to one or multiple chains directly or through linking groups by means of covalent or ionic bonds with total molecular weight in a range 1,500-5,000. A polymeric dye can include a compound having at least one chromophore attached to one or multiple chains directly or through linking groups by means of covalent or ionic bonds with total molecular weight higher than 5,000.

The dye that is included in the colored fluid having the non-aqueous polar solvent also can include a chromophore such as an azo or azo condensed, a metal complex, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphirines, perinones, perylenes, pyronins, diketopyrrolopyrroles, indigo, indigoids, thio indigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones, or any combination thereof.

Modified, oligomeric, and polymeric dyes for the colored fluids having the non-aqueous polar solvent can contain any type of one or multiple linking groups. Non-limiting examples of linking groups are sulfo-, sulfamido-, carboxy-, carboxamido-, urea-, thiourea-, urethane-, azo-, keto-, oxy-, oxyalkyl-, thio-, amino-, aminoalkyl-, phosphato-, monohalotriazolo-, dihalotriazolo-, vinyl sulfono-, phenylamino sulfono-group, or any combination thereof. Non-limiting examples of functional groups are alkyl, polyalkyl, alkylene glycol, polyalkylene glycol, alkylaryl, polyethylenimine, polyester, polyurethane, polyhaloalkyl, polyepoxy, polyurea, polyamide, polyacryl, polystyrene, polycarbonate, and any random or block copolymers thereof, and any combinations thereof. The dye may also be utilized as a colorant, a shader, for pigment surface modification to disperse and stabilize pigment particles in the fluid, for improvement of rheological properties, and/or for adjustment of interfacial tension and conductivity of the fluid.

The surfactant that is included in the colored fluid having the non-aqueous polar solvent can be an anionic, cationic, catanionic, zwitterionic (amphoteric), non-ionic, or any combinations thereof Non-limiting examples include sulfonates, phosphonates, polyethylene oxides, polypropylene oxides, polybutylene oxides containing any functional groups, and block and random co-polymers thereof alkyl, aryl, and alkylaryl amines such as primary, secondary, tertiary, and quaternary amines and polyamines; pyrrolidones, naphthalene condensates, alkynes, carboxylic acids, alcohols, polyols, and any combinations thereof The surfactant can be synthetic or natural. The surfactant may be used for colloid stabilization of pigment particles in fluid, to lower interfacial tension and thereby decrease the voltage required to cause electrowetting, and/or to increase conductivity of the fluid.

The synergist that is included in the colored fluid having the non-aqueous polar solvent can be, for example, sulfonic acid, metal salt of sulfonic acid, salt of sulfonic acid with primary, secondary, tertiary, and quaternary amines; sulfonamide, phthalimidomethyl, arylmethyl, alkyl amines, carboxylic acids, salts, amides and esters of carboxylic acids; carbonyl, amidomethyl, alkylaminomethyl, arylalkyloxy, phenylthio and phenylamino derivatives of azo, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, and pyranthrone, or any combination thereof. The synergist can also be any direct, acid, basic (cationic), reactive, vat, sulfur, solvent, food, mordant, natural, and disperse dye, derivatives, or any combination thereof It can be also a complex of any anionic dye with any cationic dye. The synergist may be used for pigment surface modification to stabilize pigment particles in the fluid, to improve rheological properties, to decrease interfacial tension, and/or to increase conductivity of the fluid.

The dispersant that is included in the colored fluid having the non-aqueous polar solvent can be selected from the following classes: anionic, cationic, zwitterionic (amphoteric), and non-ionic polymers or oligomers that are block, random, comb, grafted, dendritic polymers or co-polymers selected from the group of polyalkylene oxides such as polyethylene oxide, polypropylene oxide, or polybutylene oxide; polyamide, polyester, polyacrylate, polyethylenimine, polyether amine, polyvinyl alcohol, polyvinylacetate, polyvinylpyrrolidone, polyvinyloxazolidone, polyvinylmethyloxazolidone, polystyrene, polyepoxide, polyurethane, polyurea, polyvinyl halogen. The dispersants can be used individually or in combination with other dispersants, surfactants, and synergists. Non-limiting examples of certain commercially available dispersants are Solsperse® (available from Noveon), Tegosperse® (available from Evonik), EFKA® (available from BASF), and Disperbyk® (available from BYK Chemie).

The resin that is included in the colored fluid having the non-aqueous polar solvent can include an individual natural or synthetic resin, such as rosin and modified rosin, rosin condensates with maleic anhydride and other unsaturated compounds, gums, alkyds, acrylates, melamine aldehyde, phenol aldehyde, urea aldehyde, epoxy, polyurethane, acetal, phenolics, or any combination thereof The polymer that is included in the colored fluid having the non-aqueous polar solvent can include a natural or synthetic linear, branched, block, random, comb, grafted, dendritic polymer or co-polymer selected from polyalkylene oxides, such as polyethylene oxide, polypropylene oxide, or polybutylene oxide; polyamide, polyester, polyacrylate, polyethylenimine, polyether amine, polyvinylalcohol, polyvinylacetate, polyvinylpyrrolidone, polyvinyloxazolidone, polyvinylmethyloxazolidone, polystyrene, polyepoxide, polyurethane, polyurea, polyvinyl halogen, or any combination thereof. The polymer can contain one or multiple groups including sulfo-, sulfamido-, carboxy-, carboxamido-, urea-, thiourea-, urethane-, azo-, keto-, oxy-, oxyalkyl-, thio-, amino-, aminoalkyl-, phosphato-, monohalotriazolo-, dihalotriazolo-, vinyl sulfono-, phenylamino sulfono-, alkyl, polyalkyl, alkylene glycol, alkylaryl, halogen, alkyl and/or aryl halogen, or any combination thereof.

In one embodiment, the colored fluid includes a non-aqueous polar solvent, a self-dispersed pigment and/or a dye, and is devoid of at least a surfactant, a dispersant, and a resin. In another embodiment, the colored fluid can include at least one organic or inorganic pigment stabilized in a non-aqueous polar fluid with a surfactant, a synergist, or a dispersant.

The colored fluids including the non-aqueous polar solvent may further include other additives, such as those described in PCT/US2008/076168, filed Sep. 12, 2008, and entitled "Electrofluidic Devices, Visual Displays, and Methods for Making and Operating Such Electrofluidic Devices", the contents of which is incorporated by reference herein in its entirety. Biocides and defoamers may also be added.

The non-aqueous polar solvent may be in the range of from about 60.0 wt % to 99.9 wt %, based on the total weight of the colored fluid. In another example, the non-aqueous polar solvent may be in the range of from about 80.0 wt % to 99 wt %. The pigment content of the colored fluid having the non-aqueous polar solvent may be in the range from about 0 wt % to about 40 wt %, based on the total weight of the colored fluid. In one example, the pigment content is in the range from about 0.1 wt % to about 40 wt %, based on the total weight of the colored fluid. In another example, the pigment content is in the range from about 1 wt % to about 20 wt %, based on the total weight of the colored fluid. Pigment concentrations below 0.1 wt % will usually not provide the desired color intensity, and above 40 wt % will usually result in inadequate rheological behavior. The colored fluid having the non-aqueous polar solvent may include dye from 0 wt % up to about 80 wt % based on the total weight of the colored fluid. In another example, dye content of the colored fluid may be in the range from about 0.1% by weight to about 50% by weight based on the total weight of the colored fluid.

The colored fluid having the non-aqueous polar solvent also can include from 0 wt % up to about 200 wt % dispersant by weight of the pigment in the fluid. In another example, the colored fluid can include from 0.1 wt % up to about 80 wt % dispersant by weight of the pigment in the fluid. The colored fluid also can include from 0 wt % up to about 30 wt % synergist by weight of the pigment. In another example, the colored fluid can include from 0 wt % to 12 wt % synergist by weight of the pigment. In another example, the colored fluid can include from 0.1 wt % to 12 wt % synergist by weight of the pigment.

The colored fluid also can include from 0 wt % up to about 200 wt % surfactant, resin, and/or polymer by weight of the pigment in the fluid. In another example, the colored fluid can include from 0 wt % to 10 wt % surfactant. In another example, the colored fluid can include from 0.1 wt % up to about 10 wt % surfactant. In another example, the colored fluid can include from 0 wt % to 80 wt % resin and/or polymer by weight of the pigment. In another example, the colored fluid can include from 0.1 wt % up to about 80 wt % resin and/or polymer. In addition, the colored fluid also can include from 0 wt % to 5 wt % defoamer and/or biocide, by weight of the colorant. In yet another example, the colored fluid can include from 0.1 wt % to 5 wt % defoamer and/or biocide, by weight of the colorant.

The colored fluid having the non-aqueous polar solvent can exhibit colloidal stability from about −40° C. to about 80° C. and may have a conductivity greater than about 5 μS/cm. In another example, the colored fluid has a conductivity greater than about 5 μS/cm up to about 500 μS/cm. In still another example, the colored fluid has a conductivity from 15 μS/cm up to 100 μS/cm. In yet another example, the colored fluid has a conductivity greater than about 20 μS/cm.

In addition, the colored fluid having the non-aqueous polar solvent should have a surface tension of 10 dynes/cm to 55 dynes/cm at 25° C. In another example, the surface tension is 25 dynes/cm to 55 dynes/cm at 25° C.

The dynamic viscosity of the colored fluid having the non-aqueous polar solvent should be less than 1000 cP at 25° C. In another example, the dynamic viscosity is from 0.1 cP to 500 cP at 25° C. In still another example, the dynamic viscosity is from 0.5 cP to 100 cP at 25° C.

The EWRR of the colored fluid is in the range of 10-80%. In another example, the range is 40-80%.

With respect now to the non-polar solvent, the non-polar solvent can include a linear or branched alkane, such as dodecane and tetradecane, arylalkane, a fatty acid, an alcohol, aromatic or alicyclic hydrocarbon, a heterocyclic compound, a halogenated hydrocarbon, polymer or oligomer based on Si or Ge, such as silicone oil, cyclic siloxane, or combinations thereof. The non-polar solvent also may be a gas instead of a liquid.

The colorants for the colored fluid having the non-polar solvent can include organic pigments, dyes, such as vat and disperse dyes, or any combination thereof. Non-limiting examples of colorants include those belonging to the following classes of compounds: azo, azine, benzimidazolone, azomethine, methine, anthraquinone, arylaminoquinone, phthalocyanine, perinone, diketopyrrolopyrrole, indigo, thio-indigo, dioxazine, isoindoline, isoindolinone, iminoisoindoline, iminoisoindolinone, quinacridone, flavanthrone, indanthrone, indanthren, indole-thianaphthene, anthanthrone, anthrapyrimidine, perylene, quinophthalone, violanthrone, isoviolanthrone, violanthrene, pyranthrone, or any combination thereof, such as to provide a black colored fluid.

Specific non-limiting examples of colorants are C.I. Pigment Black 1,2, 3, 31, and 32; C.I. Pigment Green 7, 36, 37, 47, 54, and 58; C.I. Pigment Blue 15:1, 15:2, 15:3, 15:4, 15:6, 16, 21, 22, 60, 64, 65, 75, and 76; C.I. Pigment Violet 19, 23, 29, 31, 33, and 37; C.I. Pigment Red 122, 123, 144, 149, 166, 168, 170, 171, 175, 176, 178, 179, 180,183, 189, 190, 192, 196, 202, 208, 209, 214, 216, 220, 221, 224, 226, 242, 248, 254, 255, 260, 264, and 271; C.I. Pigment Orange 36, 40, 43, 51, 60, 61, 62, 64, 66, 69, 71, 72, 73, and 77; C.I. Pigment Yellow 24, 74, 83, 93, 94, 95, 108, 109, 110, 120, 123, 138, 139, 150, 151, 154, 155, 167, 170, 171, 173, 174, 175, 180, 181, 185, 192, 193, 194, 199, 213, and 218; C.I. Vat Black 1, 2, 7, 8, 9, 16, 19, 20, 21, 23, 25, 27, 28, 29, 30, 35, 44, 52, 53, 54, 55, 56, 57, 58, 63, 64, 65; C.I. Vat Brown 1,3, 5, 8, 9, 11, 14, 16, 21-26, 31, 33, 34, 37,39, 42, 44, 45, 57; C.I. Vat Green 1, 2, 3, 4-7, 8, 9, 11-14, 17, 22, 23, 29, 30; C.I. Vat Blue 1-4, 5, 6, 7-12, 13, 14-16, 18-22, 25, 26, 28-33, 35-37, 40-43, 47, 48, 51, 53, 64, 67; C.I. Vat Violet 1-5, 8-10, 13-19; C.I. Vat Red 1-2, 5,6, 10, 18-21, 23, 24, 26, 28-35, 37-42, 44, 45, 47, 48, 61; C.I. Vat Orange 1-7, 9, 11, 13, 15-21, 29, 32; C.I. Vat Yellow 1-5, 9-13, 17, 18, 20-21, 23, 26-29, 31, 33, 44, 46.

In one example, the colored fluid with the non-polar solvent defines a black colored fluid. To that end, the colorant can be specifically selected so as to provide the black colored fluid. Carbon black, such as C.I. Pigment Black 7, and certain other inorganic pigments are not suitable for the non-polar fluid of the current invention due to high conductivity. In addition, a black colored fluid having the non-polar solvent may be prepared with an individual organic colorant or a combination of two or more non-conductive colorants, as indicated above. In one example, a black colored fluid includes a blend of C.I. Pigment Blue 15:3, C.I. Pigment Orange 5, and C.I. Pigment Violet 23. In another example, the colorant is non-conductive or generally non-conductive in nature.

The surfactant, synergist, dispersant, and other additives for the colored fluid having the non-polar solvent should be non-ionic in nature and not increase the conductivity of the colored fluid. In one embodiment, the colorants, surfactants, synergists, dispersants, and other additives incorporated into the colored fluid having the non-polar solvent also should not be influenced by the application of an electric field, so as to move through the fluid by electrophoresis or dielectrophoresis. In another embodiment, the colorants, surfactants, synergists, dispersants, and other additives incorporated into the colored fluid having the non-polar solvent are influenced by the application of an electric field, so as to move through the fluid by electrophoresis or dielectrophoresis. Non-limiting examples of suitable surfactants are polyalkylene glycols and their derivatives. Non-limiting examples of suitable dispersants are polyamides, polyesters, polyacrylates, polyvinyloxazolidones, polystyrenes, polyepoxides, polyurethanes, and polyvinyl halogens. Non-limiting examples of commercially available dispersants are Solsperse® (Noveon), Tegosperse® (Evonik), EFKA® (BASF), and Disperbyk® (BYK Chemie).

The pigment content of the colored fluid having the non-polar solvent may be in the range from about 0 wt % to about 40 wt %, based on the total weight of the colored fluid. In one example, the pigment content is in the range from about 0.1 wt % to about 40 wt %, based on the total weight of the colored fluid. In another example, the pigment content is in the range from about 1 wt % to about 20 wt %, based on the total weight of the colored fluid. Pigment concentrations below 0.1 wt % will usually not provide the desired color intensity, and above 40 wt % will usually result in inadequate rheological behavior. The colored fluid having the non-polar solvent may include dye from 0 wt % up to about 80 wt % based on the total weight of the colored fluid. In another example, dye content of the colored fluid may be in the range from about 0.1% by weight to about 50% by weight based on the total weight of the colored fluid.

The colored fluid having the non-polar solvent also can include from 0 wt % up to about 200 wt % dispersant by weight of the pigment in the fluid. In another example, the colored fluid can include from 0.1 wt % up to about 200 wt % dispersant by weight of the pigment in the fluid. The colored fluid also can include from 0 wt % up to about 30 wt % synergist by weight of the pigment and from 0 wt % up to about 200 wt % surfactant and/or polymer by weight of the pigment in the fluid.

In addition, the colored fluid having the non-polar solvent should have a surface tension that is less than 25 dynes/cm at 25° C. In another example, the surface tension is from 10 dynes/cm to 25 dynes/cm at 25° C.

The dynamic viscosity of the colored fluid having the non-polar solvent should be less than 1000 cP at 25° C. In another example, the dynamic viscosity is from 0.1 cP to 500 cP at 25° C. In still another example, the dynamic viscosity is from 0.5 cP to 100 cP at 25° C.

The colored fluid having the non-polar solvent also may exhibit colloidal stability from about −40° C. to about 80° C. and may have a dielectric constant less than 3. In another example, the dielectric constant is from 1 to 3. In addition, the conductivity of the colored fluid having the non-polar solvent may be in a range of 0 pS/cm to 5 pS/cm. In another example, the colored fluid has a conductivity in a range of 0 pS/cm to 1 pS/cm. A low conductivity provides higher performance with faster switching speeds and less fouling of the surfaces of the device. The lower conductivity also retains the contact angle more effectively when the charge is applied. Whereas, for materials that increase the conductivity, the colored fluid tends to relax while voltage is still applied, which is exhibited by a decrease in contact angle or a prohibition of electrowetting altogether.

In another embodiment, a plurality of colored fluids is combined together. For example, a colored fluid having a non-aqueous polar solvent and a pigment and/or dye may be combined with a colored fluid having a non-polar solvent and a pigment and/or dye, with each including additional optional components as discussed above. The colored fluids having the non-polar solvent should not be miscible with the colored fluids having the non-aqueous polar solvent, and should not form a stable emulsion therewith. To that end, the non-polar solvent should have a cross-solubility level with the non-aqueous polar solvent that is less than about 10%. In one example, the cross-solubility is less than about 1%. In addition, components of the non-aqueous polar solvent should not migrate into the non-polar solvent or vice versa. The interfacial tension between the non-aqueous polar solvent and the non-polar solvent may be about 2 to about 55 dynes/cm. In another example, the interfacial tension between the non-aqueous polar solvent and the non-polar solvent may be about 5 to about 55 dynes/cm. If the non-polar solvent is a gas, the interfacial tension can be about 10 dynes/cm to about 55 dynes/cm. In another example, if the non-polar solvent is a gas, the interfacial tension can be about 15 dynes/cm to about 55 dynes/cm. If interfacial tension is too low, mixing of the non-aqueous polar solvent and non-polar solvent will occur, and if too high, higher voltages will be required for electrowetting response. The non-polar solvent also can have an interfacial tension value with deionized water of about 2 dynes/cm to about 60 dynes/cm.

The pigment particles that are included in the colored fluids can have a mean weight diameter ranging from about 10 nm to 5000 nm, based on dynamic light scattering particle size analysis. In one example, the mean weight diameter ranges from about 20 nm to 500 nm.

The pigment can provide a color saturation corresponding to a minimum Maxwell triangle of (0.3; 0.4), (0.4; 0.3), (0.3; 0.3) as depicted on a 1931 CIE Chromaticity diagram.

A desirable attribute of the colored fluids is stability of the fluid over a desired period of time for a given device. Stability can be characterized by operability of the device in general, particle size distribution, rheological properties (e.g., viscosity), color, etc. In addition, the colored fluids do not foul the surface of the hydrophobic or hydrophilic features of the device. The term "fouling" is meant to include a negative phenomena by which components in the colored fluid, for example pigment particles, polymers, and other components of the fluid remain (adhere to the surface) on the hydrophobic and/or hydrophilic features when the fluid undergoes movement or switching in such a manner as to cause interference with clarity or intended device performance. The colored fluid is capable of dosing and switching without fouling.

In preparing the colored fluids, the components can be premixed in a vessel equipped with a high-speed stirrer with rotation velocity in a range of 500-12,000 RPM. The mixture may then be milled utilizing known milling equipment, such as but not limited to a rotating ball mill, vibration mill, agitated horizontal or vertical media mill, basket mill, rotor/stator type machines, or attritors. The mixture may be milled by batch operation or by way of recirculation and/or discrete pass. Any known type and size of media can be employed, for example, glass, ceramics, sand, polymeric, and metal media with sizes in a range from 30 μm to about 10 cm. Typical mills include those manufactured by Eiger, Netzsch, Buhler, Premier, Chicago Boiler, Drais, Union Process, etc. Alternatively, the colored fluids may be produced on batch process equipment, such as a rotating ball mill or an agitated ball mill. The former is typified by those provided by Paul-O-Abbe; the latter is typified by those supplied by Union Process. Media size for either may range in size as noted above, and media shape may be circular, regular, irregular, or a mixture thereof. The colored fluids may also be prepared on any high-energy disperser with a shear mechanism, such as an IKA Works, Baker-Perkins, etc., sigma blade mixer. The colored fluids may optionally be filtered and/or centrifuged to remove large pigment particles, broken media, or contaminants. Other methods of preparation known in the art can also be employed. In one embodiment, concentrated colorant dispersion (mill base) of the colored fluid is first made followed by admixing of all other needed components to form the final colored fluid. Various changes and modification may be made in the invention described above without departing from the spirit and scope thereof. All descriptions are for the purpose of illustration only and are not intended to be limiting.

EXAMPLES

The following examples illustrate defails of the present invention and are not intended to limit the spirit and the scope of the invention. Unless otherwise indicated, % and parts always denote % and parts by weight.

Test procedures.

The viscosity of the colored fluids is measured with a Brookfield Viscometer LVDV–II+Pro at T=25° C., rotation speed 30 RPM, and spindle number 18.

Particle size distribution is determined using Nanotrac™ 250, NPA 250 (Microtrac, Inc.) and Microtrac™ UPA (Microtrac, Inc.).

A stability test is performed by placing a sample of the colored fluid in a closed container for four weeks at 25° C. As would be understood by one having ordinary skill in the art, the colored fluid is considered color stable if the colorant does not fall out of solution, which is determined visually. In other words, the colorant remains desirably homogeneously dispersed within the colored fluid for the duration of the test.

Interfacial tension for colored fluids having either non-aqueous polar and non polar solvents is measured using a drop tensiometer IFT Tracker™ (Teclis). The tensiometer uses drop shape analysis to calculate surface tension or interfacial tension where drop shape is determined by the forces of surface tension and gravity acting on the drop. Either a pendant drop or a rising drop configuration is used; the configuration is determined by the specific gravities and optical characteristics of fluids.

As indicated above, colored fluids having non-aqueous polar solvents are tested for electrowetting capability by evaluating change in contact angle on a hydrophobic dielectric and electrode substrate with voltage application. $SnO_2$:$In_2O_3$ coated glass is covered with 1.2-1.3 μm Parylene C dielectric and about 100 nm Cytonix Fluoropel 1601V hydrophobic fluoropolymer as the ambient. Alternately, indium tin oxide (ITO) coated glass can be covered with about 100 nm $Al_2O_3$ and about 50 nm Asahi Cytop CTL-809M hydrophobic fluoropolymer. A conductive wire attached at one point to the ITO layer of the substrate serves as the ground electrode. The substrate is submerged in a transparent non-polar solvent and a drop of colored fluid having a non-aqueous polar fluid is placed on the surface. Stepwise voltage in a range of −30V to 30V, either direct current or alternating current, is supplied to the drop through a tungsten cat whisker probe and the contact angle of the drop at each voltage is recorded and calculated using VCA Optima software program (AST Products). See Balaji Raj et al., "Ion and Liquid Dependent Dielectric Failure in Electrowetting Systems", Langmuir|3b2|ver.9|18/7/09, the contents of which is incorporated by reference herein in its entirety.

The electrical conductivity for colored fluids having the non-polar solvent is measured at 25° C. using a Scientifica 627 Conductivity Meter (Princeton Instruments). The dielectric constant is measured at 25° C. using a Scientifica 870 Liquid Dielectric Constant Meter (Princeton Instruments).

Electrowetting performance for colored fluids having the non-polar solvent is evaluated by observing change in contact angle for a drop of the colored fluid in deionized water on a hydrophobic dielectric and electrode substrate with voltage application. $SnO_2$:$In_2O_3$ coated glass is covered with 1 μm Parylene C dielectric and about 100 nm Cytonix Fluoropel 1601V hydrophobic fluoropolymer. This substrate includes a feature of designated height which provides a gap where the colored fluid may be placed when used in combination with a second substrate. Deionized water is placed on the bottom, hydrophobic substrate, which is then covered with a top substrate of $SnO_2$:$In_2O_3$ coated glass. A drop of the colored fluid is injected into the gap so that it contacts the hydrophobic bottom substrate. Alternating or direct current voltage is applied to the water and movement of the non-polar fluid is observed. Desirable performance is indicated by an increase in contact angle of the colored fluid on the hydrophobic surface and a corresponding decrease in surface area thereof when voltage is applied, and a return to initial contact angle and surface area when voltage is removed.

For testing purposes, a premix for dispersion is made at room temperature by homogenizing all components for 30 minutes at 5,000 RPM using a Dispermat high speed mixer (VMA-Getzmann GMBX) with Cowles blade. If milling is required, the premix is milled in a Mini 50 Laboratory Bead Mill M50-VSE-EXP (Eiger Machinery, Inc.) for one hour with 0.8-1.0 mm ceramic media.

Example 1

100 parts of Cab-o-Jet® 250C 10% aqueous dispersion of self-dispersed C.I. Pigment Blue15:4 (available from Cabot) and 100 parts of deionized water were placed into a glass beaker and acidified with 50 parts of 30% HCl. This slurry is heated up to 85-90° C. and agitated at this temperature for one hour. The hot dispersion is filtered, the press-cake is washed with deionized water to neutral pH, washed with two 100 part portions of methanol, and the pigment dried in the oven at 50° C. overnight. The dark blue powder is then ground. 10 parts of the pigment are premixed with 90 parts of propylene glycol (PG), which is a non-aqueous polar solvent, following by milling the slurry for one hour yielding a cyan colored fluid.

Example 2

The fluid is made as described in Example 1 but PG is replaced with propylene carbonate (PC), which is a non-aqueous polar solvent, yielding a cyan colored fluid.

Example 3

The fluid is made as described in Example 1 but Cab-o-Jet® 250C is replaced with Cab-o-Jet® 260M 10% aqueous dispersion of self-dispersed C.I. Pigment Red 122 (available from Cabot). The dark red powder is then ground. 10 parts of the pigment are premixed with 90 parts of propylene carbonate (PC) following by milling the slurry for one hour yielding a magenta colored fluid.

Example 4

20 parts of C.I. Pigment Red 254, 226-0200 (available from Sun Chemical Corp.), 2.7 parts of proprietary quinacridone derivative #1, 10 parts of polymeric dispersant Solsperse® 20,000 (available from Noveon), and 67.3 parts of propylene carbonate (available from Huntsman) are premixed and milled for one hour to form a red colored fluid with 20% pigment content that can be further diluted with appropriate solvent without flocculation to a desirable pigment concentration.

Comparative Example 4a 20 parts of C.I. Pigment Red 254 Irgazin® DPP BTR (available from Ciba), 10 parts of polymeric dispersant Solsperse® 20,000 (available from Noveon), and 70 parts of propylene carbonate (available from Huntsman) were premixed to yield a very high viscosity paste that could not be milled. Dilution of the paste with an additional amount of propylene carbonate to bring the pigment content down to 10% did not improve the sample to the point where it could be milled.

Example 5

20 parts of C.I. Pigment Black 7, Nipex® 150 (available from Evonik),10 parts of polymeric dispersant Solsperse® 20,000 (available from Noveon), and 70 parts of propylene carbonate (available from Huntsman) are premixed and milled for one hour to form a black colored fluid with 20% pigment content that can be further diluted with appropriate solvent without flocculation to a desirable pigment concentration.

Example 6

20 parts of C.I. Pigment Black 7, Nipex®150 (available from Evonik), 2 parts of a blue synergist based on copper phthalocyanine Solsperse® 12,000, 10 parts of polymeric dispersant Solsperse® 20,000 (both available from Noveon), and 68 parts of propylene carbonate (available from Huntsman) are premixed and milled for one hour to form a black colored fluid with 20% pigment content that can be further diluted with appropriate solvent without flocculation to a desirable pigment concentration.

Example 7

20 parts of C.I. Pigment Red 254, 226-0200, (available from Sun Chemical Corp.), 2.7 parts of proprietary quinacridone derivative #2, 10 parts of polymeric dispersant Solsperse® 20,000 (available from Noveon), and 67.3 parts of propylene carbonate (available from Huntsman) are premixed and milled for one hour to form a red colored fluid with 20% pigment content that can be further diluted with appropriate solvent without flocculation to a desirable pigment concentration.

Example 8

20 parts of C.I. Pigment Black 7, Nipex®150 (available from Evonik), and 10 parts of dispersant described in Example 5 of U.S. Pat. No. 7,329,315, the contents of which is incorporated by reference herein in its entirety, and 70 parts of propylene glycol are premixed and milled for one hour to form a black colored fluid with 20% pigment content that can be further diluted with appropriate solvent without flocculation to a desirable pigment concentration.

Example 9

15 parts of C.I. Pigment Black 7, Nipex®150 (available from Evonik), 2 parts of a blue synergist based on copper phthalocyanine Solsperse® 12,000, 10 parts of polymeric dispersant Solsperse® 20,000 (both available from Noveon), 9 parts of isobutanol, and 64 parts of propylene glycol are premixed and milled for one hour to form a black colored fluid with 15% pigment content that can be further diluted with appropriate solvent without flocculation to a desirable pigment concentration.

Example 10

20 parts of C.I. Pigment Violet 19, 226-6700 (available from Sun Chemical Corp.), 2.7 parts of proprietary quinacridone derivative #2, 10 parts of polymeric dispersant Solsperse® 20,000 (available from Noveon), and 67.3 parts of propylene carbonate (available from Huntsman) are premixed and milled for one hour to form a red colored fluid with 20% pigment content that can be further diluted with appropriate solvent without flocculation to a desirable pigment concentration.

Comparative Example 10a 20 parts of C.I. Pigment Violet 19, 226-6700 (available from Sun Chemical Corp.), 10 parts of polymeric dispersant Solsperse® 20,000 (available from Noveon), and 70 parts of propylene carbonate (available from Huntsman) were premixed to yield a very high viscosity paste that could not be milled. Dilution of the paste with an additional amount of propylene carbonate to bring the pigment content down to 10% did not improve the sample to the point where it could be milled.

The results/data for Examples 1-10a are set forth in Table 1 below. Comparative Examples 4a and 10a could not be milled at 10% pigment content and, thus, are not reported herein.

TABLE 1

| Colored fluid properties | | | | | | | |
|---|---|---|---|---|---|---|---|
| Example | Pigment | Content % | Viscosity (30 RPM), cP | Particle size d50, nm | Interfacial surface tension Dynes/cm | Stability, four weeks at 25° C. | EWRR % |
| 1 | C.I. PB15:4 | 10 | 97.0 | 99 | 7.8[1] | yes | 53 |
| 2 | C.I. PB15:4 | 10 | 33.0 | 159 | 9.0[1] | yes | 50 |
| 3 | C.I. PR122 | 5 | 54.0 | 1138 | 8.5[1] | no | 47 |
| 4 | C.I. PR254 | 10 | 7.9 | 341 | <5.0[2] | yes | 63 |
| 5 | C.I. PBI 7 | 5 | 5.6 | 140 | 6.9[2] | yes | 58 |
| 6 | C.I. PBI 7 | 10 | 11.8 | 142 | <5.0[2] | yes | 62 |
| 7 | C.I. PR254 | 5 | 5.4 | 380 | <5.0[2] | yes | 61 |
| 8 | C.I. PBI 7 | 5 | 63.6 | 236[3] | 5.0[2] | yes | 63 |

TABLE 1-continued

| Colored fluid properties | | | | | | | |
|---|---|---|---|---|---|---|---|
| Example | Pigment | Content % | Viscosity (30 RPM), cP | Particle size d50, nm | Interfacial surface tension Dynes/cm | Stability, four weeks at 25° C. | EWRR % |
| 9 | C.I. PBI 7 | 5 | 41.0 | 136[3] | 3.4[2] | yes | 65 |
| 10 | C.I. PV19 | 5 | 8.4 | 230 | 6.8[2] | yes | 59 |

[1]Measured in tetradecane
[2]Measured in blend 90:5:5 Dow Corning OS-30:OS-20:OS-10
[3]Particle size measured on Microtrac ™ UPA

Example 11

3.5 parts of perylene black pigment (available from Sun Chemical Corp) and 66.5 parts of dodecane, which is a non-polar solvent, were milled for 1.5 hours to yield a black colored fluid with 5% pigment content. The conductivity of the black colored fluid was 0 pS/cm and the dielectric constant was 2.05. This fluid was diluted to 1% pigment content and demonstrated good electrowetting properties.

Comparative Example 11a

A black colored fluid was prepared as in example 11, except that perylene black pigment was replaced with Special Black® 250 (available from Evonik). The conductivity of the black colored fluid was 14.6-20 pS/cm and the dielectric constant was 11-13.3. This fluid was diluted to 1% pigment content and demonstrated poor electrowetting performance.

The various embodiments of the colored fluids of the invention may be used to supply coloration in electronic displays that operate by principles of electrowetting, electrofluidics, and/or electrophoresis, in color filters, in inkjet inks, in liquid toners, and in developers.

In one specific embodiment, the colored fluids of the embodiments of the invention may be used in a display that operates according to electrowetting principles to create an image. Generally, an electrowetting device contains a plurality of individual pixels which are filled with a polar fluid and a non-polar fluid. A voltage applied to, or removed from, each pixel causes movement of the polar fluid and thereby changes the appearance or state of the pixel from, for example, a colored state to a non-colored or transparent state.

Figure 1B:
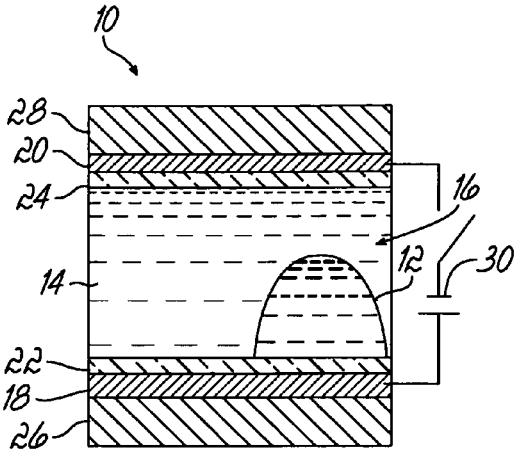
FIG. 1B is a diagrammatic cross-sectional view of the electrowetting device of FIG. 1A in which the display state of the pixel is altered.

A representative pixel 10 for use as an electrowetting device in a display is shown as an embodiment of the invention in FIGS. 1A, 1B. A polar fluid 12 including at least one non-aqueous polar solvent and at least one colorant consistent with one of the embodiments of the invention and a non-polar fluid 14 are confined inside a reservoir 16. The reservoir 16 is disposed between a first electrode 18 and a second electrode 20. Each of the electrodes 18, 20 is coated by a respective hydrophobic coating 22, 24 composed of an insulator, such as a fluoropolymer. The fluids 12, 14, electrodes 18, 20, and coatings 22, 24 in the stacked arrangement are supported by substrates 26, 28. A voltage source 30 is connected between the electrodes 18, 20 and is further connected with a control circuit (not shown) for the pixels of the display so that the pixel 10 can be addressed to change display states.

Light is supplied to the substrate 26 and directed through the stack of fluids 12, 14, electrodes 18, 20, coatings 22, 24, and substrate 28 to the environment exterior to the pixel 10. In the presence of a voltage applied by the voltage source 30 to the electrodes 18, 20 as shown in FIG. 1A, the polar fluid 12 forms a film over the hydrophobic coating 22 such that the pixel 10 has a visual appearance related to the coloration of the film. For example, if the polar fluid 12 is red in color, the light of a red wavelength is observed from the pixel 10. The color of polar fluid 12 is manifested in the light transmitted through the pixel 10 because of the increased surface area of the polar fluid 12 over the area of hydrophobic coating 22. When the potential difference is removed as shown in FIG. 1B, the polar fluid 12 responds by changing its shape and, thereby, its contact angle relative to the surface of the hydrophobic coating 22. The visible coloration of the polar fluid 12 is less apparent in the display state of FIG. 1B because less of the light is transmitted through the polar fluid 12 and, by comparison, more of the light is transmitted through the non-polar fluid 14. The non-polar fluid 14, which lacks the coloration of the polar fluid 12, preferentially wets most of the surface area of the hydrophobic coating 22 when the voltage is absent from the electrodes 18, 20 in FIG. 1B. The non-polar fluid 14 may be non-colored or transparent. These two contrasting display states of the pixel 10 shown in FIGS. 1A, 1B, along with contrasting display states of other pixels (not shown) similar to pixel 10, may be used by the display to generate an image. When the potential difference is re-applied between the electrodes 18, 20 of the pixel 10, the polar film 12 will return from the display state of FIG. 1B to the display state of FIG. 1A.

A person having ordinary skill in the art will appreciate that the pixel 10 may have various alternative constructions and that the construction shown in FIGS. 1A, 1B may vary. In an alternative embodiment, the pixel 10 may be configured such that the applied potential difference causes the polar fluid 12 to form a film as in FIG. 1A and removal of the applied potential difference produces the state of increased contact angle in FIG. 1B. Alternatively, the polar fluid 12 may be moved by the potential difference to a position within the pixel 10 at which the polar fluid 12 is not visible and hidden from an observer.

Figure 2A:
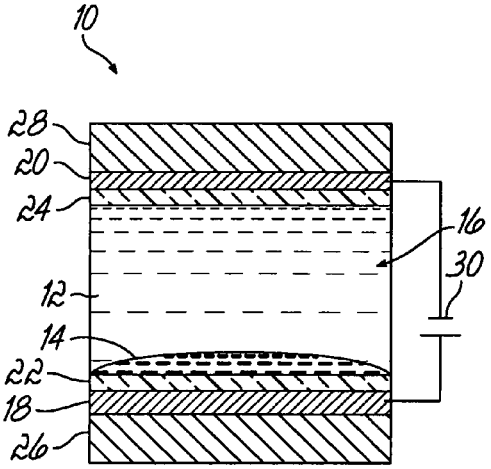
FIG. 2A is a diagrammatic cross-sectional view of an electrowetting device operating as a display pixel in accordance with an embodiment of the invention.
Figure 2B:
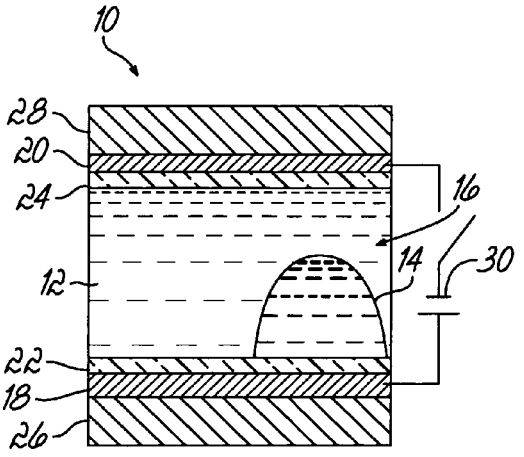
FIG. 2B is a diagrammatic cross-sectional view of the electrowetting device of FIG. [1A] *2A* in which the display state of the pixel is altered.

With reference to FIGS. 2A and 2B in which like reference numerals refer to like features in FIGS. 1A, 1B, a non-polar fluid 14, which includes at least one non-polar solvent and at least one colorant consistent with one of the embodiments of the invention, may have a coloration that is preferably black and may be used in the display pixel 10 along with the polar fluid 12 to create an image. In one embodiment, the black colored non-polar fluid 14 forms a film over the hydrophobic coating 22 as shown in FIG. 2A, which creates a dark, e.g., black, image area. When a potential difference is applied as in FIG. 2B, polar fluid 12 will wet the hydrophobic coating 22, and the non-polar 14 will be moved to, for example, form a droplet characterized by a decreased surface area. As a result, the color of the non-polar fluid 14 is confined to a small visible area of the pixel 10 and the appearance of the pixel 10 will primarily reflect the coloration of the polar fluid 12, which will be non-colored or transparent. These two contrasting display states of the pixel 10 shown in FIGS. 2A, 2B, along with contrasting display states of other pixels (not shown) similar to pixel 10, may be used by the display to generate an image.

Figure 3A:
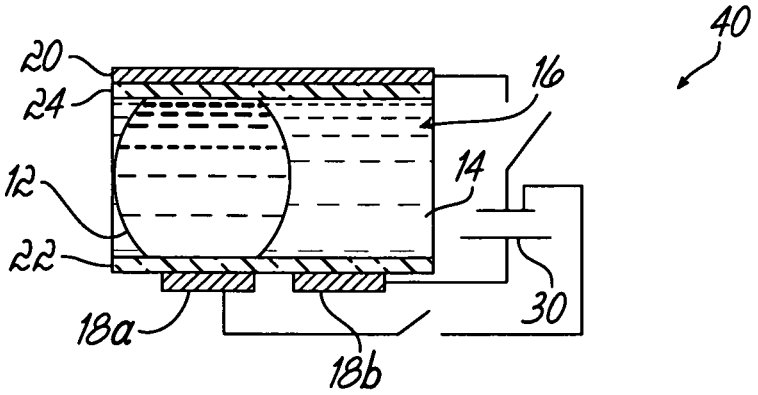
FIG. 3A is a diagrammatic cross-sectional view of an electrowetting device operating as a display pixel in accordance with an embodiment of the invention.
Figure 3B:
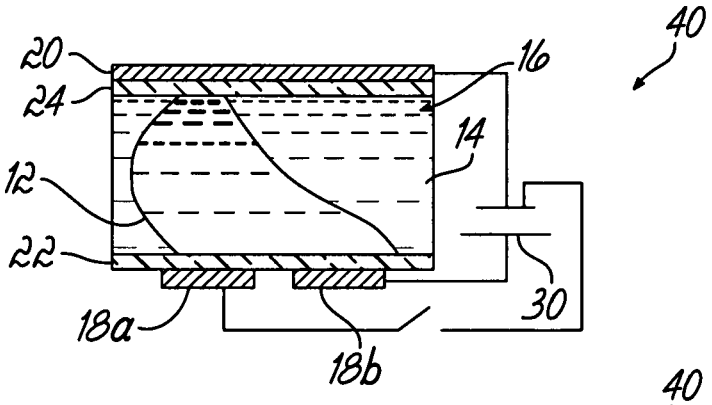
FIG. 3B is a diagrammatic cross-sectional view of the electrowetting device of FIG. 3A in which the display state of the pixel is being altered.
Figure 3C:
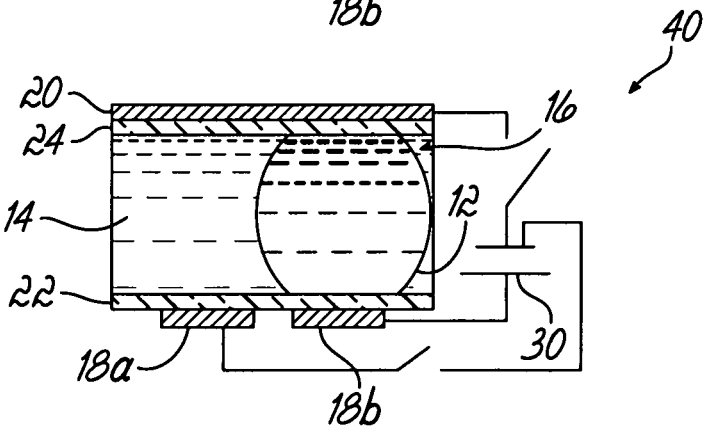
FIG. 3C is a diagrammatic cross-sectional view of the electrowetting device of FIG. [3C] *3A* in which the display state of the pixel is altered.

With reference to FIGS. 3A-C in which like reference numerals refer to like features in FIGS. 1A, 1B and in accordance with an embodiment of the invention, the polar fluid 12 of the embodiments of the invention may be used in a pixel 40 of a display in which a droplet of the polar fluid 12 is moved within the pixel 40 from a non-visible position (FIG. 3A) to a visible position (FIG. 3C). Substrates similar to substrates 26, 28 are present but are omitted from the views for clarity. The transition of the polar fluid 12 between the non-visible and visible positions is apparent in FIG. 3B. The electrode 18 of pixel 40 is segmented into two discrete electrodes 18a, 18b. Electrode 18a is located in a portion of the pixel 40 for which the polar fluid 12 is hidden and not visible to an observer and electrode 18b is located in a portion of the pixel 40 for which the polar fluid 12 is visible to an observer due to the transmission of light through the polar fluid 12.

By switching the potential difference applied between the electrodes 18b, 20, the polar fluid 12 is moved from the non-visible position (FIG. [2A] *3A*) to the visible position (FIG. 3B). In the visible position, light is transmitted through the polar fluid 12 and acquires a wavelength that reflects the coloration of the polar fluid 12. The light, after acquiring the characteristic coloration, is transmitted through the hydrophobic coating 24 and electrode 20 and out of the pixel 40 to an observer. The polar fluid 12 is returned from the visible position (FIG. 3C) to the non-visible position (FIG. 3A) to re-establish the initial display state by application of a potential difference to electrodes 18a, 20.

These two contrasting display states of the pixel 40 shown in FIGS. 3A, 3C, along with contrasting display states of other pixels (not shown) similar to pixel 40, may be used by the display to generate an image. In an alternative embodiment, the non-polar fluid 14 of the pixel 40 may be colored in addition to the coloration of the polar fluid 12. The embodiments of the polar fluid 12 described herein may be used in a device pixel, such as pixel 40, to improve image contrast.

Figure 4A:
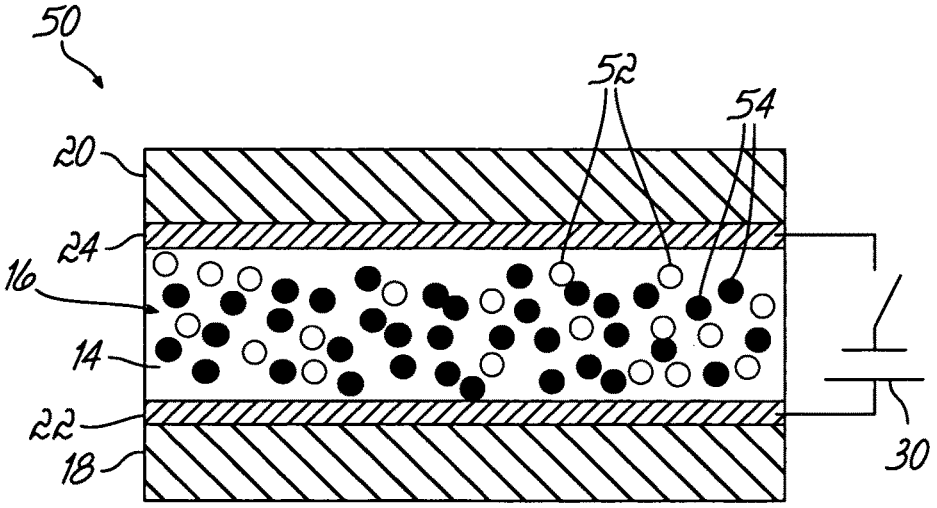
FIG. 4A is a diagrammatic cross-sectional view of an electrophoretic device operating as a display pixel in accordance with an embodiment of the invention.
Figure 4B:
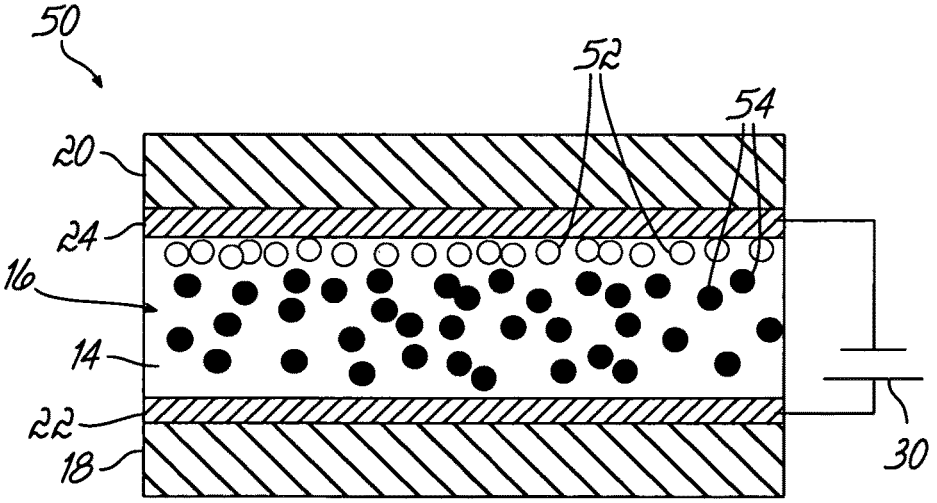
FIG. 4B is a diagrammatic cross-sectional view of the electrophoretic device of FIG. 4A in which the display state of the pixel is altered.

The colored non-polar fluid having a composition consistent with the embodiments of the invention can also be used in an electrophoretic device for a display. With reference to FIGS. 4A, 4B in which like reference numerals refer to like features in FIGS. 1A, 1B and in accordance with an embodiment of the invention, the non-polar fluid 14 may be used as the contrasting color for a pixel 50 of single particle type electrophoretic display. Specifically, charged particles 52 are suspended within a volume of non-polar fluid 14 and the pixel 50 has the appearance of the coloration of the non-polar fluid 14. When a potential difference is applied between the electrodes 18, 20 by a voltage from the voltage source 30, the charged particles 52 are electrostatically attracted toward at least one of the electrodes 18, 20, in this instance electrode 20 as shown in FIG. 4B. As a result of the redistribution of the charged particles 52 within the bulk of the colored non-polar fluid 14, the visible appearance of the pixel 50 changes to reflect the coloration of the charged particle 52 due to the change in display state. These two contrasting display states of the pixel 10 shown in FIGS. 4A, 4B, along with contrasting display states of other pixels (not shown) similar to pixel 50, may be used by the display to generate an image. Alternatively, when the colorant particles *54* in the non-polar fluid 14 are appropriately charged, the colored non-polar fluid 14 may be a contrasting color in a dual particle type display.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised" or variants thereof are used in either the detailed description or the claims, such terms are intended to be inclusive in a manner similar to the term "comprising."

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A colored fluid for electrowetting, electrofluidic, or electrophoretic devices comprising:

at least one non-aqueous polar solvent [having]; *wherein the colored fluid has* (a) a dynamic viscosity of 0.1 cP to 50 cP at 25° C., (b) a surface tension of 25 dynes/cm to 55 dynes/cm at 25° C., and (c) an electrowetting relative response of 40% to 80%; and at least one colorant [selected from a pigment and/or a dye] *comprising at least one pigment and at least one polymeric dispersant;*

*wherein the non-aqueous polar solvent is selected from one or more of the following formulas:*

*(1)*

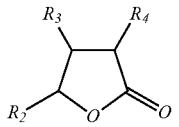

*(2)*

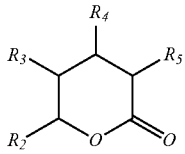

*(3)*

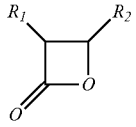

*-continued*

(4)

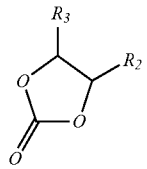

(5)

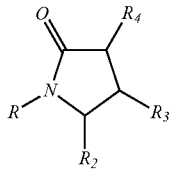

(6)

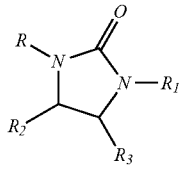

(7)

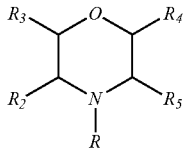

(8)

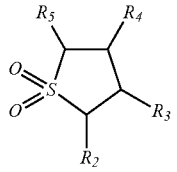

(9)

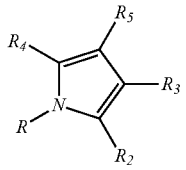

*wherein:*

*R and $R_1$ each independently is H, a $C_1$-$C_{12}$ alkane (Alk), an aryl (Ar), an alkane aryl, or $O(RR_1O)_nH$;*

*$R_2$, $R_3$, $R_4$, and $R_5$ independently are H, $C_1$-$C_{12}$ Alk, Ar, AlkAr, halogen, OH, OAlk, OAr, SAlk, SAr, COOH, COOR, COOAr, CONAlk, CONar, =O, $CH_3C$=O, CN, $N(R)_4$, $CONR(ROH)_m$, $COO(RR_1O)_nR$, $CONR(RR_1O)_nR$, or $NRR_1(RR_1O)_nH$;*

*n=1-50; and*

*m=1-2.*

[2. The colored fluid of claim 1 wherein the non-aqueous polar solvent is selected from the group consisting of glycols, alcohols, polyols, ethers, esters, ketones, acetals, ketals, lactones, carbonates, lactams, urethanes, ureas, pyrrolidines, pyrrolidones, sulfones, sulfoxides, amides, primary, secondary, tertiary, or quaternary amines, imines, nitriles, carboxylic acids, aldehydes, halogenated, thio, or nitro compounds, and any combinations thereof.]

[3. The colored fluid of claim 1 wherein the non-aqueous polar solvent is selected from one or more of the following formulas:

(1)

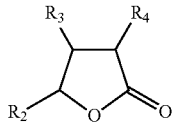

(2)

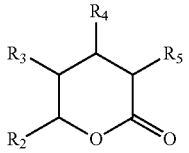

(3)

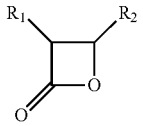

(4)

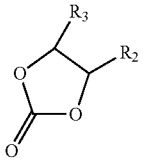

(5)

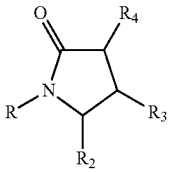

(6)

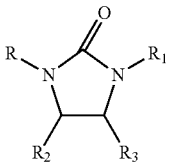

(7)

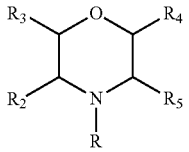

(8)

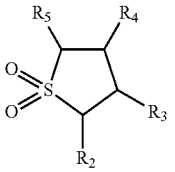

(9)

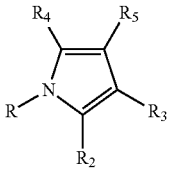

wherein;

R and $R_1$ each independently is H, a $C_1$-$C_{12}$ alkane (Alk), an aryl (Ar), an alkane aryl, or $O(RR_1O)_nH$;

$R_2$, $R_3$, $R_4$, and $R_5$ independently are H, $C_1$-$C_{12}$ Alk, Ar, AlkAr, halogen, OH, OAlk, OAr, SAlk, SAr, COOH, COOR, COOAr, CONAlk, CONAr, =O, $CH_3C{=}O$, CN, $N(R)_4$, $CONR(ROH)_m$, $COO(RR_1O)_nR$, $CONR(RR_1O)_nR$, or $NRR_1(RR_1O)_nH$;

n=1-50; and m=1-2.]

4. The colored fluid of claim 1 wherein the non-aqueous polar solvent is selected from the group consisting of [1,2-propylene glycol, 1,3-propylene glycol, 1,4-butylene glycol, diethylene glycol, dipropylene glycol,] ethylene carbonate, propylene carbonate, 1,2-butylene carbonate, 1,2-cyclohexane carbonate, glycerine carbonate, dimethyl carbonate, diethyl carbonate, [acetophenone, pyridine, dimethyl malonate, diacetone alcohol, hydroxypropyl carbamate, beta-hydroxyethyl carbamate, N-methyl formamide, N-methyl acetamide, dimethylsulfoxide,] sulfolane, 2-pyrrolidone, N-methyl-2-pyrrolidone, N-cyclohexyl-2-pyrrolidone, [acetonyl acetone, cyclohexanone, ethyl acetoacetate, ethyl-L-lactate,] pyrrole, N-methylpyrrole, N-ethyl pyrrole, [4H-pyraN-4-one,] 1,3-dimethyl-2-imidazolidinone, morpholine, N-methylmorpholine, N-ethylmorpholine, N-formylmorpholine, beta-propiolactone, beta-valerolactone, beta-hexylactone, gamma-butyrolactone, gamma-valerorolactone, gamma-hexylactone, gamma-heptalactone, gamma-octalactone, gamma-nonalactone, gamma-decalactone, delta-valerolactone, delta-hexylactone, delta-heptalactone, delta-octalactone, delta-nonalactone, delta-decalactone, delta-tetradecalactone, delta-octadecolactone, and any combination thereof.

[5. The colored fluid of claim 1 wherein the colorant is the pigment.]

[6. The colored fluid of claim 5 wherein the pigment is a self-dispersed pigment.]

[7. The colored fluid of claim 6 is devoid of a surfactant, a dispersant, and a resin.]

8. The colored fluid of claim [5] *1*, wherein the pigment includes a plurality of particles having a mean weight diameter from 10 nm to 5000 nm.

[9. The colored fluid of claim 5 further comprising at least one dispersant.]

[10. The colored fluid of claim 5 wherein the pigment is a self-dispersed pigment, the non-aqueous polar solvent is selected from the group consisting of a lactone, a carbonate, is 1,2-propylene glycol, 1,3-propylene glycol, 1,4-butylene glycol, diethylene glycol, and dipropylene glycol, and wherein the colored fluid is devoid of a surfactant, a dispersant, and a resin.]

[11. The colored fluid of claim 1 wherein the colorant is the dye.]

[12. The colored fluid of claim 11 is devoid of a surfactant, a dispersant, and a resin.]

13. The colored fluid of claim 1 further comprising [a dispersant,] an extender, a synergist, a surfactant, a resin, a polymer, a biocide, or any combination thereof.

14. The colored fluid of claim 1 comprising 60.0 wt % to 99.9 wt % non-aqueous polar solvent and 0.1 wt % to 40.0 wt % colorant, based on a total weight of the colored fluid.

15. The colored fluid of claim 14 wherein the colorant is the pigment and [further comprising] *comprises* 0.1 wt % to 200 wt % dispersant based on wt % of the pigment.

16. The colored fluid of claim 1 wherein the non-aqueous polar solvent has a dielectric constant greater than 10.

17. The colored fluid of claim 1 is devoid of a non-polar solvent.

[18. The colored fluid of claim 1 having a dynamic viscosity of 0.1 cP to 1000 cP at 25° C., an interfacial tension of 2 dynes/cm to 55 dynes/cm at 25° C., and an electrowetting relative response of 10% to 80%.]

19. The colored fluid of claim [18] *1* having a conductivity greater than 5 μS/cm.

20. The colored fluid of claim [18] *1* having color stability for at least 4 weeks at 25° C.

21. A pixel for a display, the pixel comprising:

a reservoir;

a colored fluid in the reservoir, the colored fluid, including at least one non-aqueous polar solvent, having (a) a dynamic viscosity of 0.1 cP to 50 cP at 25° C., (b) a surface tension of 25 dynes/cm to 55 dynes/cm at 25° C., and (c) an electrowetting relative response of 40% to 80%, and at least one colorant [selected from a pigment and/or a dye] *comprising at least one pigment and at least one polymeric dispersant*; and a plurality of electrodes configured to apply a potential difference effective to move the colored fluid relative to at least one of the electrodes;

*wherein the non-aqueous polar solvent is selected from one or more of the following formulas:*

*(1)*

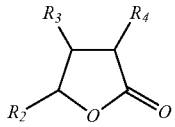

*(2)*

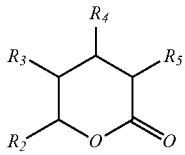

*(3)*

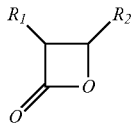

*(4)*

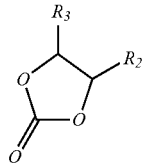

*(5)*

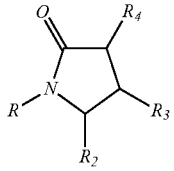

*(6)*

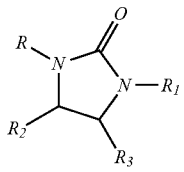

*(7)*

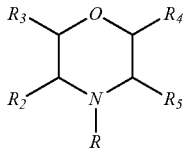

*-continued*

(8)

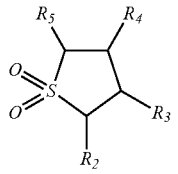

(9)

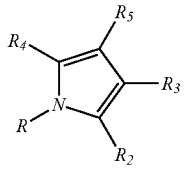

*wherein:*

*R and $R_1$ each independently is H, a $C_1$-$C_{12}$ alkane (Alk), an aryl (Ar), an alkane aryl, or $O(RR_1O)_nH$;*

*$R_2$, $R_3$, $R_4$, and $R_5$ independently are H, $C_1$-$C_{12}$ Alk, Ar, AlkAr, halogen, OH, OAlk, OAr, SAlk, SAr, COOH, COOR, COOAr, CONAlk, CONAr, =O, $CH_3C{=}O$, CN, $N(R)_4$, $CONR(ROH)_m$, $COO(RR_1O)_nR$, $CONR(RR_1O)_nR$, or $NRR_1(RR_1O)_nH$;*

*n=1-50; and*

*m=1-2.*

*22. The colored fluid of claim 1, additionally comprising a synergist.*

*23. The pixel claim 21, wherein the colored fluid additionally comprises a synergist.*

* * * * *